A. SAMPSON.
Preserving Cranberries
No. 37,058. Patented Dec. 2, 1862.
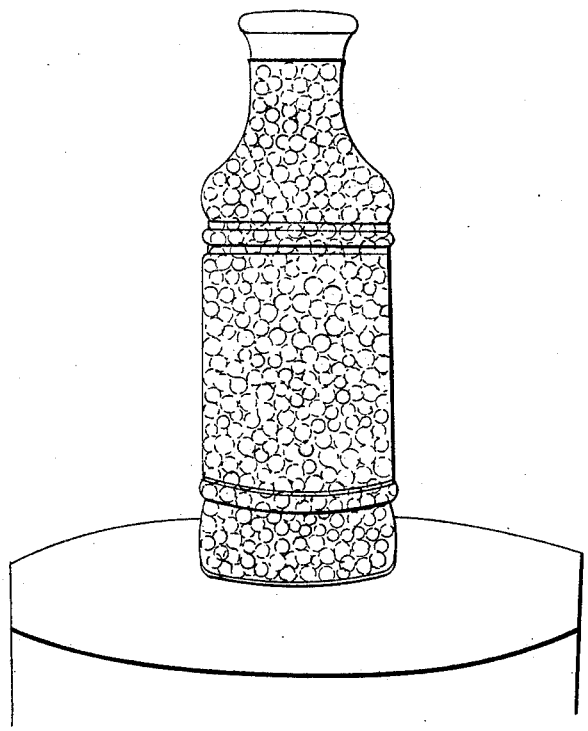
Witnesses
Isaac A. Brunele
James H. Parsons
Inventor
Abel Sampson

UNITED STATES PATENT OFFICE.

ABIEL SAMPSON, OF PROVIDENCE, RHODE ISLAND.

IMPROVEMENT IN PUTTING UP CRANBERRIES FOR PRESERVATION.

Specification forming part of Letters Patent No. 37,058, dated December 2, 1862.

*To all whom it may concern:*

Be it known that I, ABIEL SAMPSON, of North Providence, in the county of Providence and State of Rhode Island, have invented a new and useful Improvement in Putting Up and Preserving Cranberries for Future Cooking Purposes; and I do hereby declare that the following is a full, clear, and exact description of the same, reference being had to the accompanying drawing, representing a package of preserved cranberries.

Heretofore cranberries, as an article of domestic consumption, have been obtainable only through the fall, winter, and early spring months, owing to the fact that this fruit softens and decays rapidly at the approach of the warm season or by exportation to a warmer climate. This softening and decaying may be arrested and delayed for a time by keeping the fruit in water, and changing the water frequently, which is the method generally employed by farmers and others having a small quantity on hand for their own consumption.

My invention consists in putting up cranberries in hermetically-sealed packages of convenient size and form for family use or exportation, the fruit being preserved in its natural condition in such packages by being submerged in water, by means of which this fruit may be preserved in a convenient and salable form throughout the year for more than one season and in a warm climate. This method of putting up and preserving cranberries has numerous advantages, for, whereas this fruit especially is injured in quality and flavor by the ordinary method of preserving fruit in sealed packages by first cooking or partially cooking the same and expelling the air therefrom by heating the fruit in the jar, can or package, whatever it may be, and sealing the same while it is hot, by expelling the air from the fruit by submeging it in water in the can, jar, &c., and afterward sealing the same, this fruit is preserved in its natural condition for a great length of time without impairing either the quality or flavor of the same in the least degree. Besides this, cranberries may be preserved in this way much cheaper than by the ordinary method, a package of this kind costing but little more than the fruit of itself, and this fruit is afforded in the most desirable form and condition for either home consumption or exportation at a season of the year when it has not heretofore been obtainable.

In putting up cranberries by my improved method either glass or metallic jars or cans may be used, or wooden kegs with air-tight seams. The berries should be gathered in cool weather, and submerged in water soon after gathering. After being placed in the jars or cans the latter should be at once sealed and put away in a dry and cool situation until wanted for cooking or transportation. Cranberries put up in this form or manner afford a delicious and useful sauce on shipboard on long voyages and in localities visited by epidemic fevers, as it is possible to distribute this fruit in this form in localities and climates where it has been hitherto unknown.

Having thus described my invention, I wish it understood that I do not claim, broadly, submersion in water as a means for preserving cranberries, as this is well known; also, that I do not restrict myself to any particular form or size of package, intending to make use of any and every kind or style of package which I may use lawfully, suitable for preserving and transporting the submerged cranberries with convenience and success.

What I claim as my invention, and desire to secure by Letters Patent, is—

The merchantable package of cranberries preserved in their natural condition by being submerged in water, as a new manufacture or article of trade.

ABIEL SAMPSON.

Witnesses:
   ISAAC A. BROWNELL,
   JAMES A. PARSONS.